April 2, 1946.	J. D. PETSCHE	2,397,561
COLLET TUBE COLLAR
Filed Jan. 17, 1944
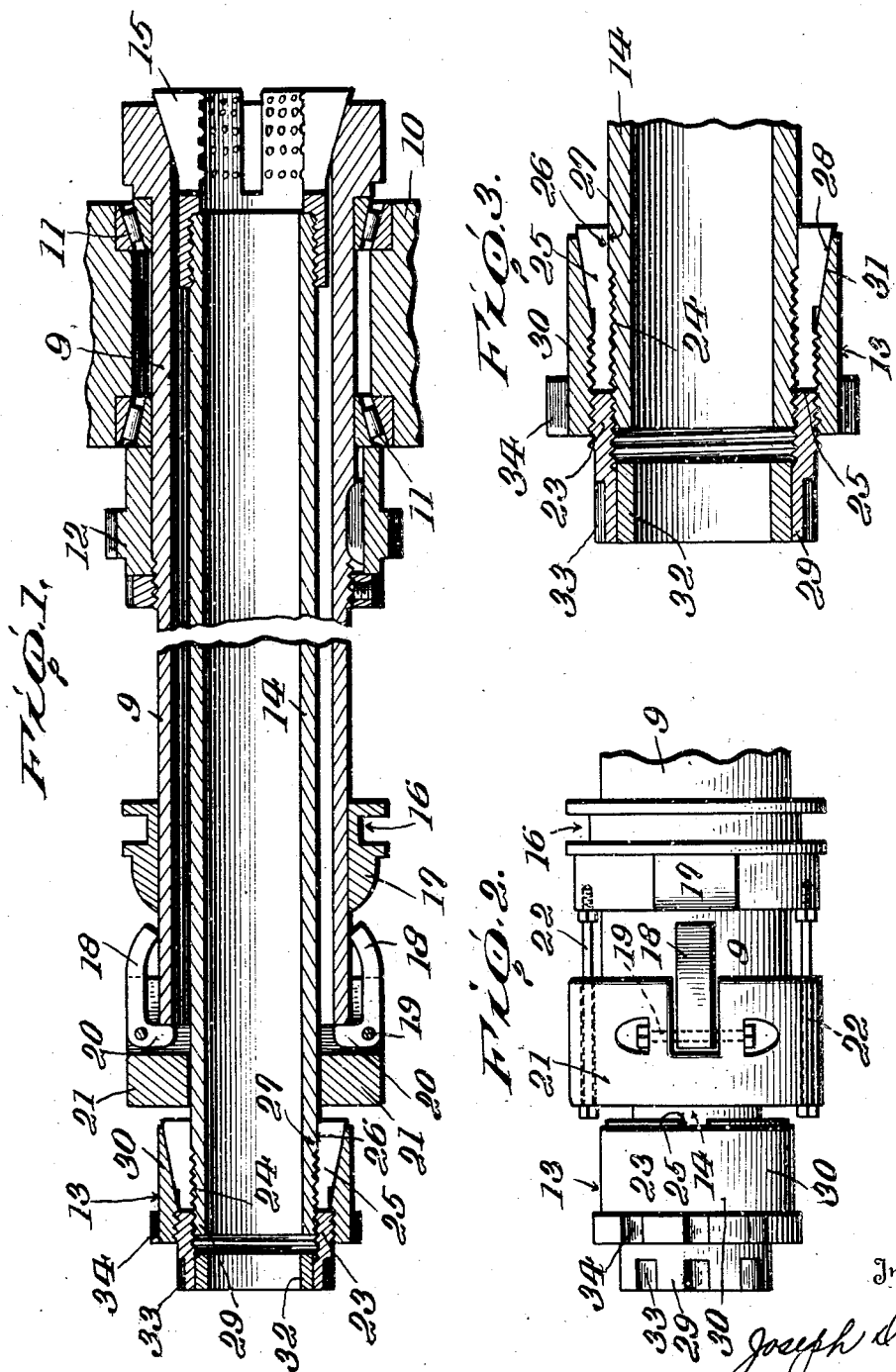

Patented Apr. 2, 1946

2,397,561

UNITED STATES PATENT OFFICE 2,397,561

COLLET TUBE COLLAR

Joseph D. Petsche, Cleveland, Ohio

Application January 17, 1944, Serial No. 518,604

5 Claims. (Cl. 279—51)

The invention relates generally to collet structures, and more particularly to a collet structure such as is employed in an automatic barstock working machine, and it primarily seeks to provide an improved collar for said collet.

Heretofore, in collet structures of the character stated a collar construction was utilized which was screwed onto the collet tube and held in place by a brass plug which was forced against the threads of the collet tube by a steel set screw. With this type of construction, strains on the tube caused frequent breakage at the weakest point, namely the threaded region adjacent the end of the collar. In addition, the brass plug sometimes fell out during removal of the collar with the result that upon subsequent replacement of the collar and tightening of the set screw the threads on the collet tube became marred and the tube thereby was rendered unserviceable.

It is, therefore, an object of the invention to provide a collar construction which is sturdy and not subject to frequent breakage or damage.

Another object of the invention is to provide a novel collar structure in which it is possible to eliminate the objectionable set screw and brass plug equipment formerly used to hold the collar on the collet tube.

It is a further object of the invention to provide a collar structure formed of a few simple parts and in which the collar is firmly clamped in place by gripping engagement of smooth cylindrical surface of the collar against a smooth cylindrical surface of the collet tube in a manner for eliminating breakage at a portion of the tube weakened by collar mounting thread equipment.

With the above and other objects in view that will hereinafter appear, the nature of the invention will be more fully understood by the following detailed description, the appended claims and the several views illustrated in the accompanying drawing.

In the drawing:

Figure 1 is a fragmentary view illustrating a collet tube and driving mechanism such as are employed in conjunction with an automatic barstock working machine.

Figure 2 is a fragmentary side elevation of a portion of the structure shown in Figure 1, the collar, the finger holder and the collet operating spool being shown.

Figure 3 is an enlarged central longitudinal sectional view illustrating the improved collar.

The spindle portion of the machine on which the improved collar is used is best shown in Figure 1. The spindle 9 is fixed against endwise movement and is rotatably mounted in a support member 10 on tapered roller bearings 11. The spindle is rotated through a driving gear 12 which is keyed to the spindle. In the example of embodiment of the invention herein disclosed the improved collar is generally designated 13 and shown as mounted at the left-hand end of a collet tube 14, the collet 15 which grips the barstock being mounted at the right-hand end of said tube. Barstock (not shown) is fed through the collect tube 14 from left to right, as viewed in Figure 1, and is worked on beyond or at the right of the collet 15.

When the collet tube 14 is shifted toward the left, the illustrated draw-in type of collet 15 is caused to be contracted to grip the barstock within the collet tube. When the force pushing the collet tube toward the left is released, the resiliency of the jaws of the collet 15 shifts the collet tube 14 toward the right to release the barstock. The collet tube 14 is shifted to the left through the medium of a fork (not shown) which engages in the annular groove 16 in the operating spool 17 and shifts said spool toward the left so as to cause a spreading of crank fingers 18 which are pivotally mounted at 19 on a finger holder 21 slidably embracing the collet tube 14. The spreading of the fingers causes the inner crank end portions 20 to engage the adjacent end of the spindle 9 and bring about a shifting of the finger holder 21 toward the left to engage the end of the collar and pull the collet tube 14 to the left so as to effect a contracting of the collet 15 and a gripping of the barstock.

When the collet operating spool 17 is shifted to the right, a pair of bolts 22, shown in Figure 2 and slidable within the finger holder 21, serve to pull the finger holder away from the collar 13. The natural resiliency of the fingers of the collet 15 cause shifting of the collet tube 14 to the right with a consequent release of the barstock.

It is to be understood that the foregoing description is standard practice on automatic barstock working machines and that the spindle illustrated in Figure 1 is only one of a number of spindles on a single machine. All the spindles are mounted on an indexing head, and a complex cam and gear, all not shown, operate the indexing, the fork mechanism for clamping and releasing the barstock, the mechanism for pushing the barstock through the collet tube so that it projects a given distance from the end, and other mechanisms for bringing the various tools into engagement with the end of the barstock to drill, form, thread ream, or otherwise work the barstock.

In accordance with the present invention, the improved collar generally designated 13 and best shown in Figure 3, includes a sleeve member 23 which is threaded onto external threads provided on the left hand end of the collet tube 14. The sleeve member 23 is provided with a plurality of slits 25 extending throughout a portion of its length, at the right hand end as viewed in Figures 2 and 3 and has a smooth cylindrical portion 26 extending to the right beyond the internally threaded portion and overlying a smooth portion 27 of the collet tube 14. The outer surface of the split end of the sleeve 23 is flared as at 28, and one end 29 of the sleeve 23 overhangs or extends beyond the left hand end of the collet tube 14. A nut sleeve 30 is threaded onto the outside of the sleeve member 23 and has a smooth, flared internal end portion 31 which overlies and cooperates with the flared external surface 28 of said sleeve member when the sleeve nut is threaded along the sleeve member to force the spring fingers of the sleeve 23 resulting from the provision of the end slits 25 into engagement with the collet tube 14. A brass sleeve insert 32 is pressed into the non-threaded left hand end 29 of the sleeve 23, which insert has an inside diameter approximately the same as that of the collet tube 14 so as to engage and serve to prevent marring of the barstock which passes through the collet tube 14. The sleeve member 23 is provided with an externally presented wrench receiving surface 33, and the sleeve nut 30 is provided with an externally presented wrench receiving surface 34.

It will be obvious that the extent of contraction of the collet 15 can be controlled by adjustment of the collar 13 lengthwise of the collet tube 14.

By using the improved collar, frequent breakage which occurred in the former construction has been substantially eliminated and the improved collars have been used for long periods of time with no breakage of collet tubes. By forming the collar structure in the manner hereinabove described, the smooth surface equipped split sleeve member end is disposed for abutting engagement by the abutment ring 21 and the threaded portion of the sleeve member is disposed remotely with respect to said abutment ring. In this manner the shock of engagements of the abutment ring 21 with the collar structure will be received by the tightly clamped smooth surfaces 26, 27 and not directly by the weakened, threaded portions of the tube and collar structures.

From the foregoing it will be apparent that an improved collet tube collar has been provided which completely overcomes the disadvantages of known conventional collar equipments and which is of simple and inexpensive construction.

It is to be understood that the details of construction of the cooperating parts can be variously changed without departing from the spirit and scope of the invention, as defined in the appended claims.

What is claimed is:

1. A collar structure for a collet tube comprising a cylindrical sleeve member threaded onto one end of the collet tube and including an elongated smooth internal surface engaging an unthreaded portion of the collet tube and a flared external surface surrounding said smooth internal surface, and a sleeve nut threaded onto the outside of the sleeve member and provided with an internally flared end portion engaging the flared external surface of the sleeve member and effective upon threading of said nut along the sleeve member to press the flared portion of said sleeve member into tight engagement with the collet tube.

2. A collar structure for a collet tube comprising a cylindrical sleeve member threaded onto one end of the collet tube and including an elongated smooth internal surface at one end thereof engaging an unthreaded portion of the collet tube and a flared external surface surrounding said smooth internal surface, said flared end portion being split to provide resilient gripper fingers, a sleeve nut threaded onto the outside of the sleeve member and provided with an internally flared end portion engaging the flared external surface of the sleeve member and effective upon threading of said nut along the sleeve member to press the resilient gripper fingers into tight engagement with the collet tube with the opposed smooth sleeve member and tube surfaces tightly in clamped contact.

3. The combination of a collet tube having a split and flared collet at one end and a collar at its other end, means supporting said tube including a member having a flared bore portion engaging the flared collet, an abutment ring embracing and slidable along the tube for alternately engaging the collar to move the tube lengthwise to draw the collet into said flared bore portion and contract said collet and then for moving away from said collar to free the tube and permit the collet to move endwise and expand in said flared bore portion, said collar comprising a cylindrical sleeve member threaded onto one end of the collet tube and including an elongated smooth internal surface at one end thereof engaging an unthreaded portion of the collet tube and a flared external surface surrounding said smooth internal surface, said flared end portion being split to provide resilient gripper fingers, a sleeve nut threaded onto the outside of the sleeve member and provided with an internally flared end portion engaging the flared external surface of the sleeve member and effective upon threading of said nut along the sleeve member to press the resilient gripper fingers into tight engagement with the collet tube with the opposed smooth sleeve member and tube surfaces in tightly clamped contact, said smooth surface equipped split sleeve member end being disposed for abutting engagement by the abutment ring and the threaded portion of said sleeve member being disposed remotely with respect to said abutment ring.

4. A collar structure for a collet tube comprising a sleeve member threaded onto one end of the collet tube and including an unthreaded internal surface extending closely over an unthreaded portion of the collet tube, and a nut threaded onto the outside of the sleeve member, said sleeve member and nut member having opposed cooperatively engaging surfaces at least one of which bears angular relation to the axis of said unthreaded internal surface whereby said engaging surfaces will cooperate to set up an inward camming action against the sleeve effective upon threading of said nut along the sleeve member to press the unthreaded internal surface of the sleeve member into tight gripping engagement with the collet tube.

5. The combination of a collet tube having a split and flared collet at one end and a collar at its other end, means supporting said tube including a member having a flared bore portion engaging the flared collet, an abutment ring embracing and slidable along the tube for alternately engaging the collar to move the tube lengthwise to draw the collet into said flared bore portion and contract said collet and then for moving away from said collar to free the tube and permit the collet to move endwise and expand in said flared bore portion, said collar comprising a sleeve member threaded onto one end of the collet tube and including an unthreaded internal surface extending closely over an unthreaded portion of the collet tube, and a nut threaded onto the outside of the sleeve member, said sleeve member and nut member having opposed cooperatively engaging surfaces at least one of which bears angular relation to the axis of said unthreaded internal surface whereby said engaging surfaces will cooperate to set up an inward camming action against the sleeve effective upon threading of said nut along the sleeve member to press the unthreaded internal surface of the sleeve member into tight gripping engagement with the collet tube, and the tube gripping end extension of said sleeve member being disposed for abutting engagement by the abutment ring and the threaded portion of said sleeve member being disposed remotely with respect to said abutment ring.

JOSEPH D. PETSCHE.